(12) United States Patent
Chandra

(10) Patent No.: US 6,263,326 B1
(45) Date of Patent: Jul. 17, 2001

(54) METHOD PRODUCT 'APPARATUS FOR MODULATIONS'

(75) Inventor: Arun Chandra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/078,241

(22) Filed: May 13, 1998

(51) Int. Cl.[7] ................................................ G06F 15/18
(52) U.S. Cl. ........................... 706/21; 706/2; 706/50
(58) Field of Search ......................... 706/2, 50, 21

(56) References Cited

U.S. PATENT DOCUMENTS

| | | | |
|---|---|---|---|
| 5,289,562 | 2/1994 | Mizuto et al. | 704/200 |
| 5,381,513 | 1/1995 | Tsuboka | 704/232 |
| 5,459,798 | 10/1995 | Bailey et al. | 382/218 |
| 5,774,591 | * 6/1998 | Black et al. | 382/236 |
| 5,884,626 | * 3/1999 | Kuroda et al. | 600/300 |
| 5,911,581 | * 6/1999 | Reynolds et al. | 434/236 |
| 5,918,222 | * 6/1999 | Fukui et al. | 707/1 |
| 5,987,415 | * 11/1999 | Breese et al. | 704/270 |
| 6,020,883 | * 2/2000 | Herz et al. | 345/327 |

OTHER PUBLICATIONS

Chandra et al, "Using Causal Reasoning to Validate Stochastic Models" IEEE Proceedings of the 10th Conference on Artificial Intelligence for Applications, Mar. 1994.*

Yang et al, "Individual Cell Loss Probabilities and Background Effects in ATM Networks", IEEE International Conference on Communications, May 1993.*

William J. Stewart; 1994; Introduction to the Numerical Solution of Markov Chains; "Direct Methods", Princeton University Press; pp. xv–xvii; 63–70.

Kishor Shridharbhai Trivedi; 1982; Probability and Statistics with Reliabiltiy, Queuing, and Computer Science Applications; "Discrete–Parameter Markov Chains"; Printice––Hall, Inc; Chapter 7, pp. 309–317.

Carver A. Mead; 1980; Introduction to VLSI Systems; "Algorithms for VLSI Processor Arrays", Addison–Wesley; Chapter 8, pp. 271–292.

Arun Chandra, "A Computational Architecture to Model Human Emotions", IEEE Proceedings of the Intelligent Information System, Dec. 1997.

* cited by examiner

*Primary Examiner*—George B. Davis
(74) *Attorney, Agent, or Firm*—Anthony V. S. England; Robert M. Carwell

(57) ABSTRACT

A computer modulates among a number of states. Information stored in the computer memory includes predefined categories of an expected external stimulus. For example, the stimulus may include events and the categories include types of events. Also stored in memory are the predetermined states and likelihood functions for transitioning from one state to another. The states may represent emotional states, and the events represent emotion bearing events. Each type of event may have predefined emotional characteristics, with the likelihood functions being response to the occurrence of the events, the categorization of the events, and the characterization of the event's category.

31 Claims, 9 Drawing Sheets

|  | R | S |
|---|---|---|
| event 1 | 0.4 | 0.2 |
| event 2 | 0.2 | 0.2 |
| event 3 | 0.1 | 0.6 |

$B = (1 - k_i) S$
$A = (1 - k_i) R$

LOOKUP TABLE 200

FIG. 2

METHOD PRODUCT 'APPARATUS FOR MODULATIONS'

FIELD OF THE INVENTION

This invention relates generally to computerized state machines, and more specifically may apply to state machines having probabilistic transitions among states, where the machine is subjected to external stimulus.

BACKGROUND

Many expert systems have been developed to model human analytical reasoning. Also, many machine learning techniques exist for modeling human learning ability. Such systems and techniques have not generally incorporated the modeling of emotion, and uncertainty which may accompany transitions from one emotional state to another. Further, such systems and techniques have not generally included an aspect of emotional states being modulated under conditions of uncertainty responsive to emotion bearing events. A need therefore exists in this area.

More generally, a need exists for determining a state of a generalized system under conditions of uncertainty, particularly where the system is subject to an external stimulus which modifies uncertainty parameters.

SUMMARY

The foregoing need is addressed in the present invention.

It is one object of the invention to model system states under conditions of uncertainty. The modeling uses a computational engine. In one implementation, the modeling includes some aspects of Markov modeling.

A primary application contemplated for such a model is in the area of human emotion. In such an application, the system states represent feelings and states of mind or body (referred to herein collectively as emotional states), and the uncertainty concerns uncertainty associated with changes in emotional state. Accordingly, it is another object to include emotional components in the intelligence of "intelligent agents", such as may be used in a variety of applications.

This system and method can be applied as a solution in various service industries. Some examples are:

1. Flight Controller Room Monitoring (Aviation)

Referring to FIG. 7, an emotion engine 710 monitors the mental and emotional states of a flight control crew based on stimuli collected about the traffic, close calls, time of day, length on desk, etc., which is input to the engine 710 from stations 720, 730, etc. Output from the emotion engine 710 triggers indicators 750, 760, etc. at the flight controller stations and provides mental and emotional state status to the shift schedule console 780. Additionally, a similar emotion engine and data collection system could also be used to monitor a pilot's emotional state.

2. Medical Patient Monitoring (Medical)

In this application, the system monitors the emotional state of medical patients. Certain information, such as heart rate, blood pressure, etc. is automatically collected and input to the system. Other information, such as delivery of medication, physical examination observations, etc. are input manually to the system. The system gives a health care provider an automated way to monitor emotional state, chart progress, and recommend treatment.

3. Personal Calendar Assistant (Planning)

Referring to FIG. 8, emotional engine 810 assists in scheduling meetings to optimize on the probability of a person being in a receptive state. The emotion engine 810 receives, as input, data from previous calendar entries including the current day and Day−1, Day−2, and Day−3. The engine 810 outputs a predicted emotional state for proposed future meetings on the current day or future days, such as Day+1, etc. This helps manage calendars, including helping administrative assistants schedule or reject meetings.

4. Media Application (Advertising)

In this application, the system is used to judge the effectiveness of a movie, TV show, or commercial by measuring the change in emotional state evoked due to the media event.

5. Cell Phone Monitoring (Communication)

In appropriate business applications, when caller privacy concerns are not preemptive, a cell phone center or dispatch center monitors call content, call frequency, caller tone of voice, receiver tone of voice, etc. to determine a "nervousness index", alertness index, etc. For example, police, delivery, and taxicab dispatch applications are especially suitable.

According to the present invention, the foregoing and other objects are attained by a computer aided method for modulating among a number of predetermined states. Information is stored in a memory associated with the computer and processed by the computer. The stored information includes information representing predefined categories of an external stimulus, n predetermined states, and likelihood functions for probability of respective transitions among the respective states. Transition probability values are computed, using the likelihood functions, in response to categorization of the external stimulus which is input to the computer. In a further aspect, the system transitions from an initially activated one of the emotional states to subsequently activated ones of the states, in response to the transition probability values.

The invention further contemplates that the states may represent emotional states, such as emotional states of a human or other sentient being or group of beings, or of an entity to which an emotional state may be imputed.

In addition, in one embodiment the external stimulus includes information representing emotion bearing events, and initializing the system includes defining: i) potential ones of such events and ii) one or more effects, on the transition probabilities, of the occurrence of such a defined potential event. That is, for each of the emotion bearing events first, second, third, etc. emotional characteristics are defined, and an effect on parameters of the likelihood functions is defined for each of the characteristics. According to this embodiment, the computing of probabilities responsive to the external stimulus may include computing the probabilities responsive to: i) an actual occurrence of one of the defined potential events, and ii) the defined effects.

In alternative embodiments, the invention may be practiced as a computer system, or as a computer program product for performing the above described method steps.

It is an advantage of the present invention that it can be applied as a solution in various service industries like the health, aviation, advertising, and communication industries.

Additional objects, advantages, and novel features are set forth in the following description, or will be apparent to those skilled in the art or those practicing the invention. Other embodiments are within the spirit and scope of the invention. These objects and embodiments may be achieved by the combinations pointed out in the appended claims. The invention is intended to be limited only as defined in the claims.

BRIEF DESCRIPTION OF THE DRAWINGS

FIG. 2 illustrates a lookup table for generating values of the likelihood function parameters R and S, shown in FIG. 1A, in response to external stimuli.

DETAILED DESCRIPTION

To clearly point out novel features of the present invention, the following discussion omits or only briefly describes conventional features of information processing systems and Markov models which are apparent to those skilled in the art. It is assumed that those skilled in the art are familiar with these conventional features.

It is known to use Markov models for representing system states and processing based on the states. See, for example, Delbert D. Bailey and Carole Dulong, U.S. Pat. No. 5,459,798, "System and Method of Pattern Recognition Employing a Multiprocessing Pipelined Apparatus with Private Pattern Memory," describing use of a Markov model in a neural network for pattern recognition. According to these applications, states are represented as nodes. The nodes have interconnecting paths, or "arcs", among states. Each arc has an associated weight which may represent a probability of a transition along that path between states. The combination of the nodes and arcs define a network. The weights for the arcs define a pattern in the network.

As described by Bailey, et al., the network weights for a Markov model may be established by processing one or more training patterns. Then an unknown pattern, also having a number of nodes (also states, or "points"), may be compared, point by point, or state by state, to the trained network. This comparison develops a match path indicating the level of identity between the unknown and reference pattern.

The present invention employs certain aspects of the Markov modeling just described, and includes some additional, novel elements. In one or more embodiment, the invention further concerns novel applications, wherein the states represent emotional states, and the external stimulus includes emotion bearing events.

Figure 1A:
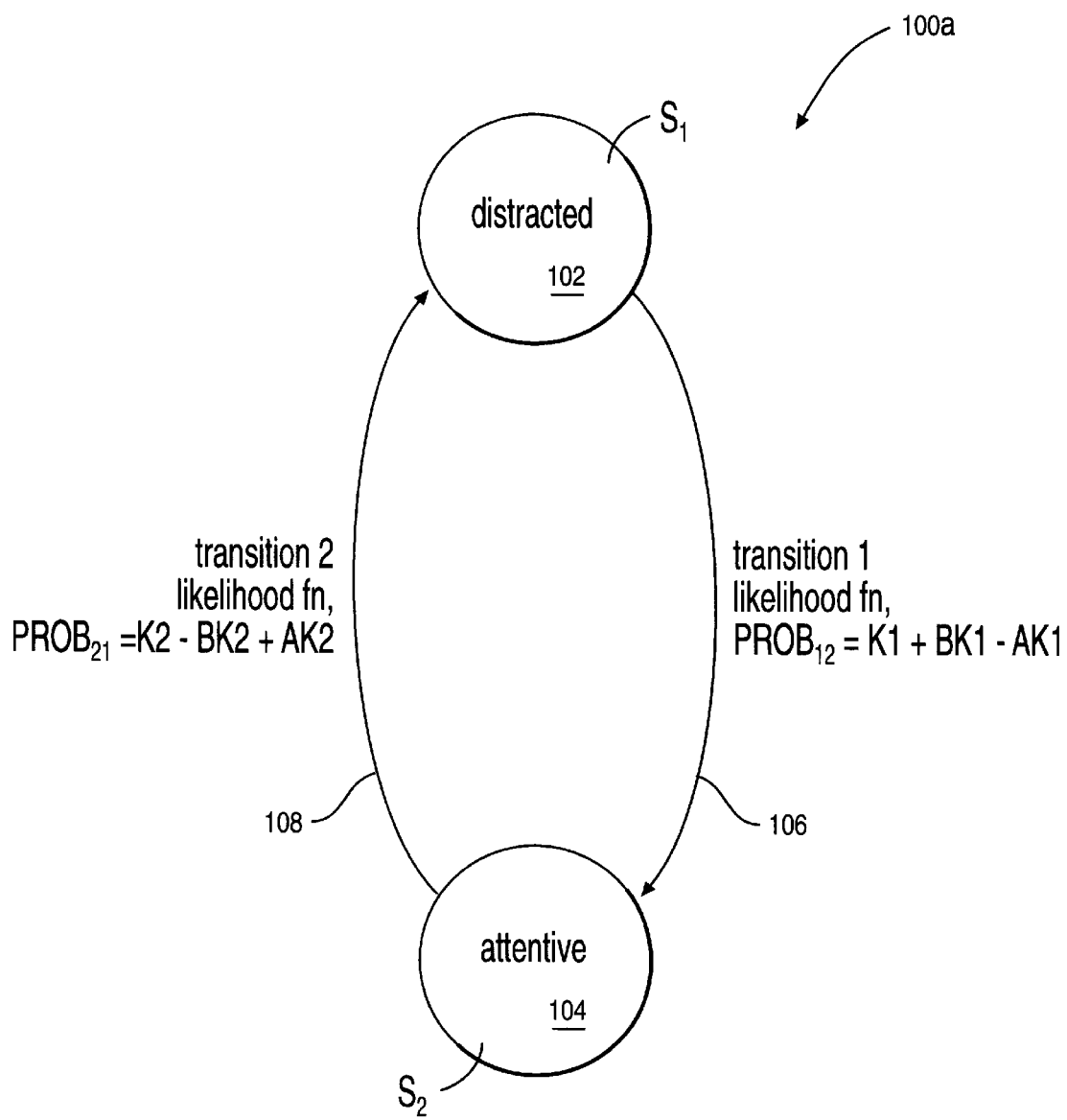
FIG. 1A illustrates aspects of a two state model which may be implemented by a computer system. In this illustration, the states represent emotional states.

Referring now to FIG. 1A, aspects of two state model 100A are illustrated. This model might be applied for simulating the mental and emotional state of an air traffic controller, for example. A first state representing a "distracted" mental and emotional state is shown at node 102. A second state, representing an "attentive" mental and emotional state, is shown at node 104. Arc 106 is shown between node 102 and node 104 and has a direction indicated by an arrowhead thereon so that arc 106 represents a transition directed from node 102 to node 104. Similarly, arc 108 with its arrowhead indicates a transition directed from node 104 to node 102. A likelihood function, $PROB_{12}=k1+Bk1-Ak1$, is shown for transition one, that is, the transition along arc 106 from the distracted state 102 to the attentive state 104. The value of this likelihood function represents the probability of such a transition occurring. Similarly, a likelihood function, $PROB_{21}=k2-Bk2+Ak2$, is shown for the second transition, that is, a transition along arc 108 from the attentive node 104 to the distracted node 102. Each transition, that is arc, has its own associated constant. Transition 1 has a constant K1 in its likelihood function, whereas transition 2 has a constant K2 in its likelihood function. Parameters A and B are common to each likelihood function.

Figure 1B:
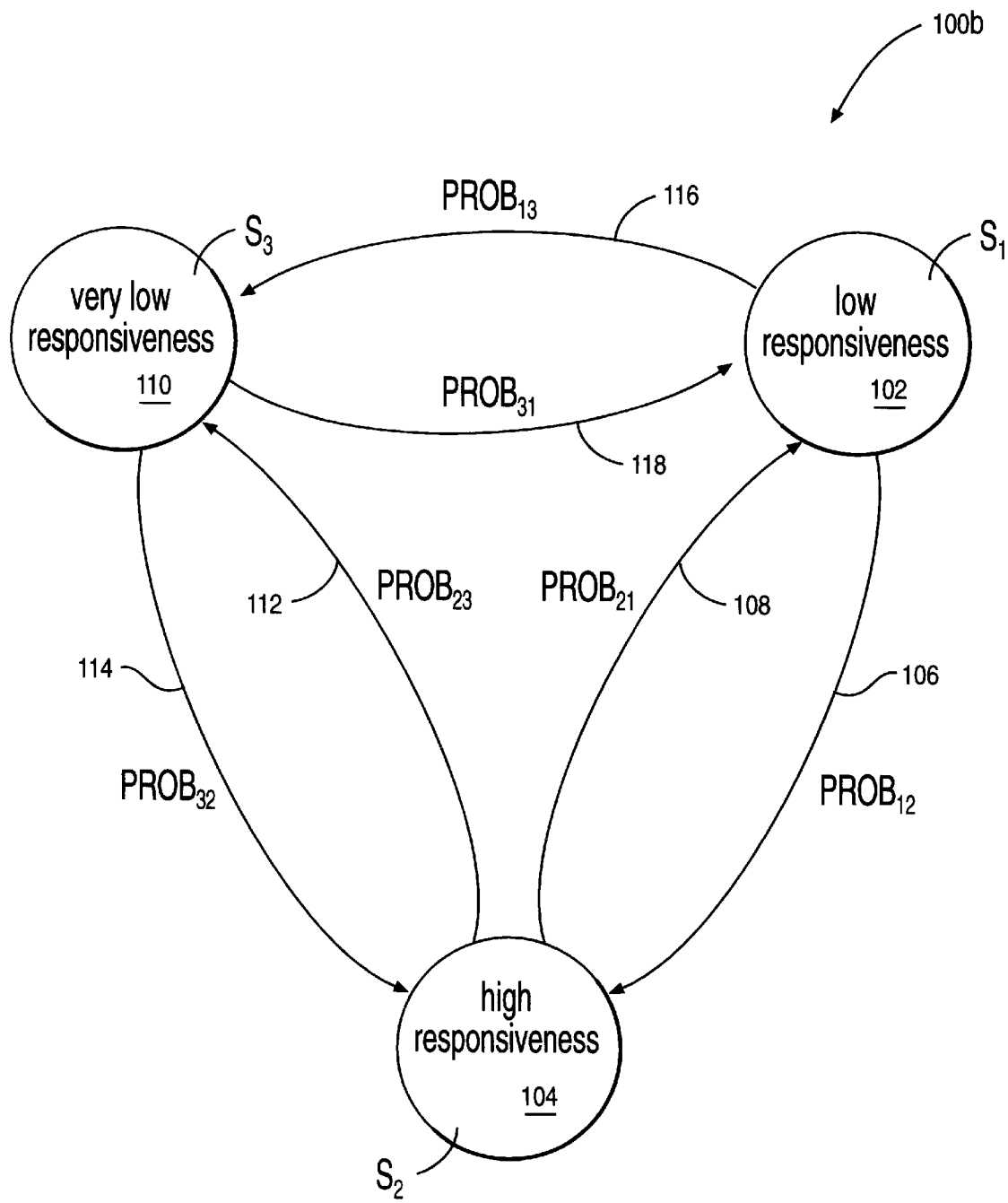
FIG. 1B illustrates a three state model similar to FIG. 1A.

Referring now to FIG. 1B, a three state model 100B is illustrated. According to this model, a first state corresponding to a "low responsiveness" mental and emotional state is represented by node 102. A second state representing a "high responsiveness" mental and emotional state is represented by node 104, and a third state representing a "very low responsiveness" mental and emotional state is represented by node 110. Six possible transitions between nodes are represented by arcs 106, 108, 112, 114, 116, and 118. It should be understood that, as in the two state model of FIG. 1A, each transition has an associated likelihood function. Thus, in addition to the two likelihood functions set out above, four more such functions apply. For example, the third transition from state 2 to state 3 has a likelihood function, $PROB_{23}=k3-Bk3+Ak3$.

Referring now to FIG. 2, a lookup table 200 is illustrated. According to an aspect of one embodiment of the invention, external events (i.e., external stimuli) have an effect on the likelihood functions which define the probabilities of transitions between emotional states, as described above.

The lookup table 200 includes a number of predefined events which it is contemplated may occur. For example, for the air traffic control application, events in the lookup table could be such as onset of darkness, elapsed time of a flight controller on shift exceeding some limit, number of aircraft exceeding a certain limit, deterioration or improvement in weather, etc. For each such event in the table there are associated R and S values, which translate to the A and B values in the likelihood functions.

For example, in the model of FIG. 1A, suppose that K1 and K2 are 0.55 and 0.45, respectively, and that A and B are initially 0.3 and 0.2, respectively. For these initial conditions, the probability of a transition from state S1 to state S2 is as follows:

$$P12=K1+B*K1-A*K1=0.55*(1+0.2-0.3)=0.495$$

Similarly, the probability of a transition from state S2 to state S1 is as follows:

$$P21=K2-B*K2+A*K2=0.45*(1-0.2+0.3)=0.605$$

Then, after the occurrence of event 3, for example, the probabilities become the following:

$$P12=K1*(1+(1-K1)*S-(1-K1)*R)=0.55*(1+0.45*0.6-0.45*0.1)=0.67;$$

and $$P21=K2*(1-(1-K2)*S+(1-K2)*R)=0.45*(1-0.55*0.6+0.55*0.1)=0.33$$

The value of A and B can be defined in many ways. However the relationship between A, B, K1, K2 . . . KN should be defined in conformance with the laws of probability, so that all probability values are in the range 0 through 1. In the above application A is defined as $(1-Ki)R$, and B is $(1-Ki)S$, where R and S vary in a range such that P12 and P21 remain in the range 0 through 1, given the selected values of K1 and K2.

Event 1 in table 200 represents an event which has somewhat more negative overtones than positive, and therefore has an R value somewhat larger than the S value. Event 2 represents an event having equal positive and negative overtones. Event 3 has relatively more positive than negative overtones.

As may be seen from the above, the signs associated with the A and B parameters, and the coefficient K1 and K2 differ for the two likelihood functions P12 and P21, so that the occurrence of an event has a different effect on the two probabilities.

Figure 3A:
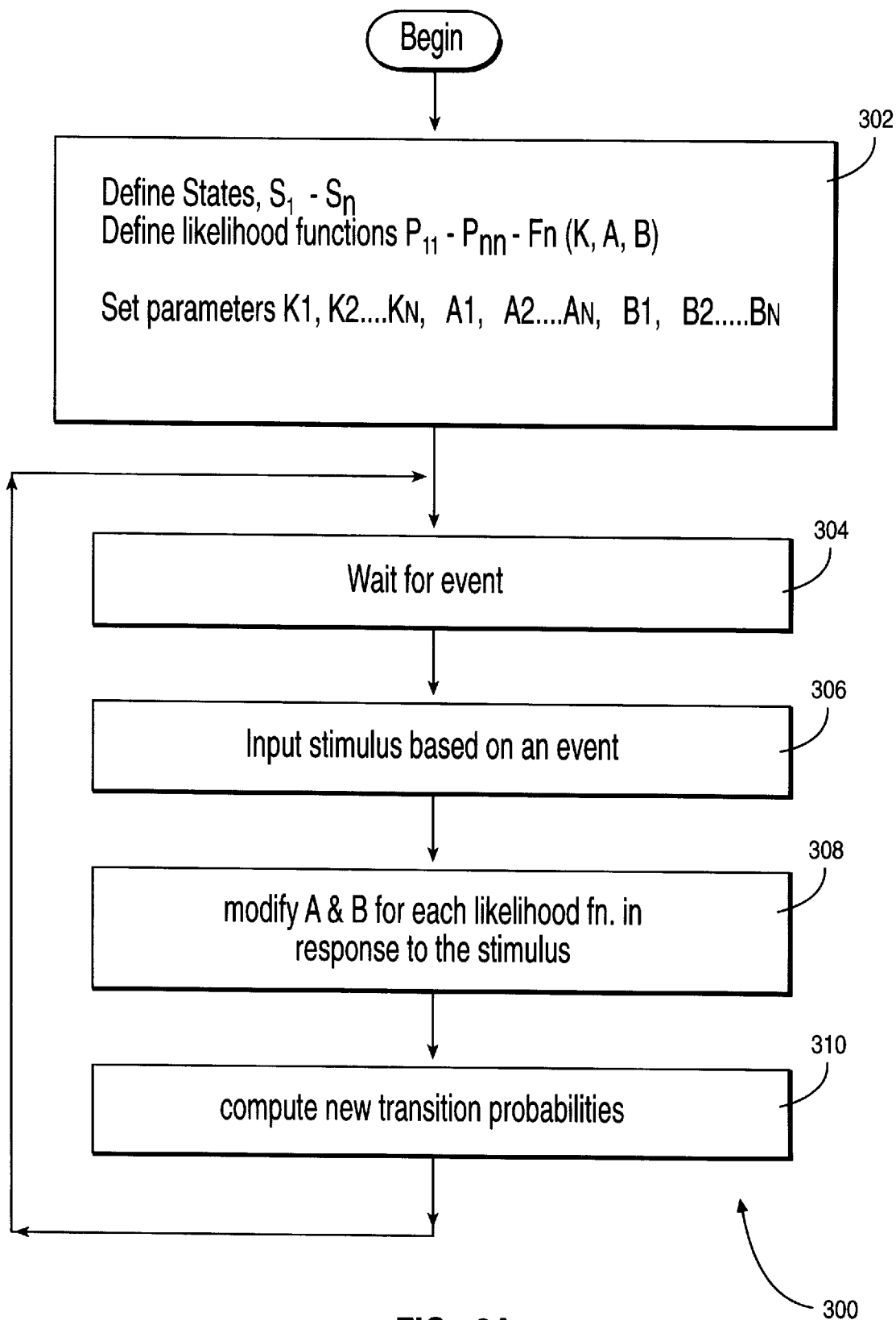
FIGS. 3A and 3B are flow charts of illustrative computer program implementations of the invention.

Referring now to FIG. 3A, a flow chart is shown illustrating aspects of an embodiment of the invention, wherein transition probabilities are updated in response to events. This is referred to as the emotion update flow chart 300. In step 302, the program is initialized. In the initialization step, the N states of the model are defined, the likelihood functions for probability of transitions among the N states are defined, and the parameters of the likelihood functions are set.

In step 304, the system waits for occurrence of a predefined event. Then, in step 306, a stimulus is input such as in response to occurrence of such an event. Suppose, the stimulus which occurs may be categorized as an event, and the event corresponds to one of the possible events set out in the lookup table. Say it is event two, for example. Then in step 308, the lookup table 2 may be used to lookup new values of R and S, which are translated to A and B. Next in step 310, transition probabilities are computed for all of the arcs in the model using the revised A and B parameters.

Figure 3B:
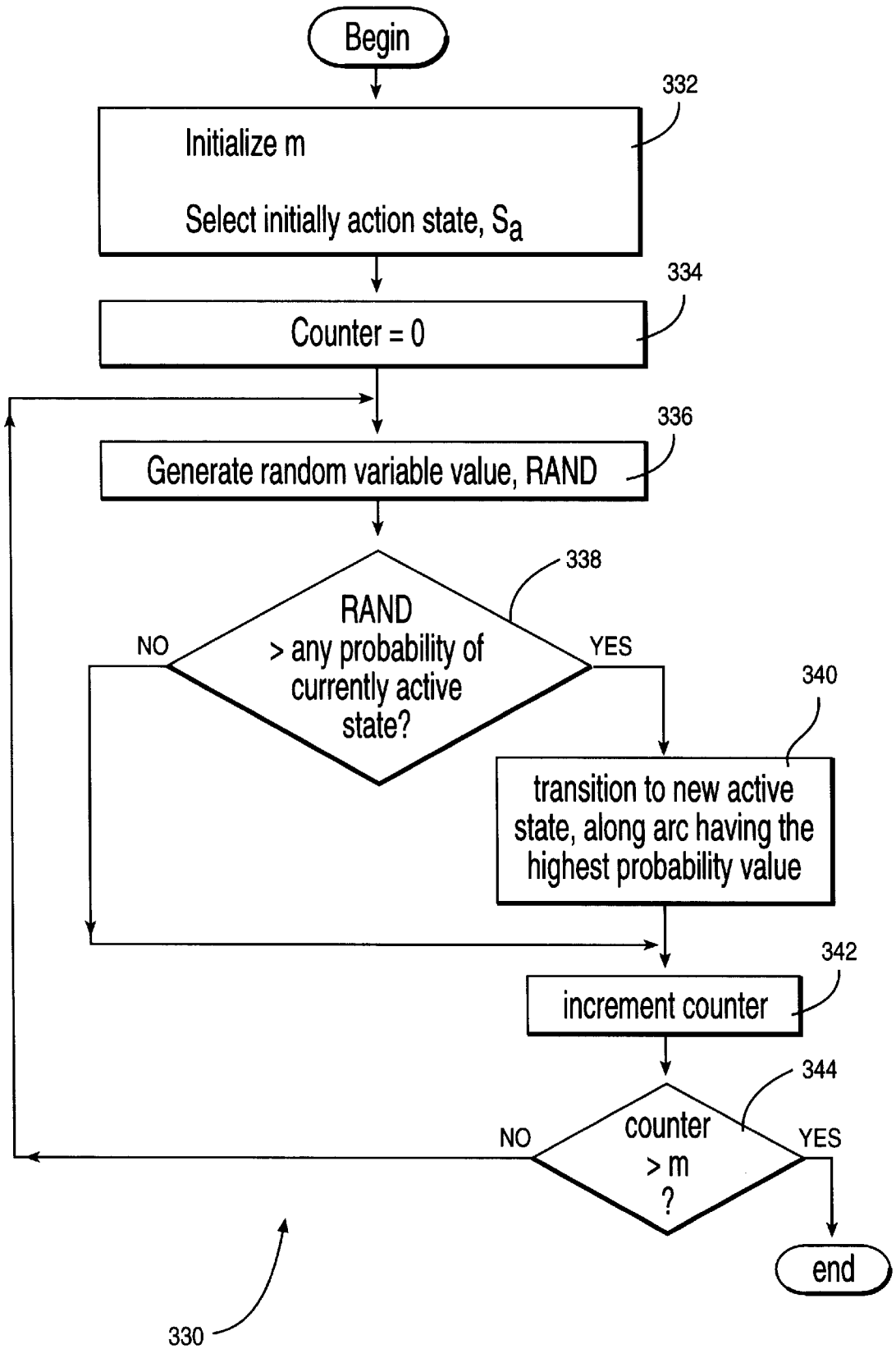

Referring now to FIG. 3B, a flow chart 330 is shown for a Monte Carlo simulation of state changes, for m iterations. Initialization occurs in step 332. In step 336, a random variable value, RAND, is generated which ranges from 0 through 1. This value is compared to the probabilities for the arcs originating at the presently active state, at step 338. If the random variable value does not exceed the value of the probability compliment for any of the probabilities, then the system's current state does not change and the program proceeds to the next time iteration at 342 and 344. (For an arc, the term "probability compliment", as used herein, refers to 1 minus the probability value for that arc.) If, on the other hand, the random variable value does exceed at least one of the probability compliments, then a transition is made to a new active state along the arc having the highest probability value, at step 340. Then, the next iteration of time proceeds, at steps 342 and 344, and so on until a targeted reference time is obtained.

Figure 4:
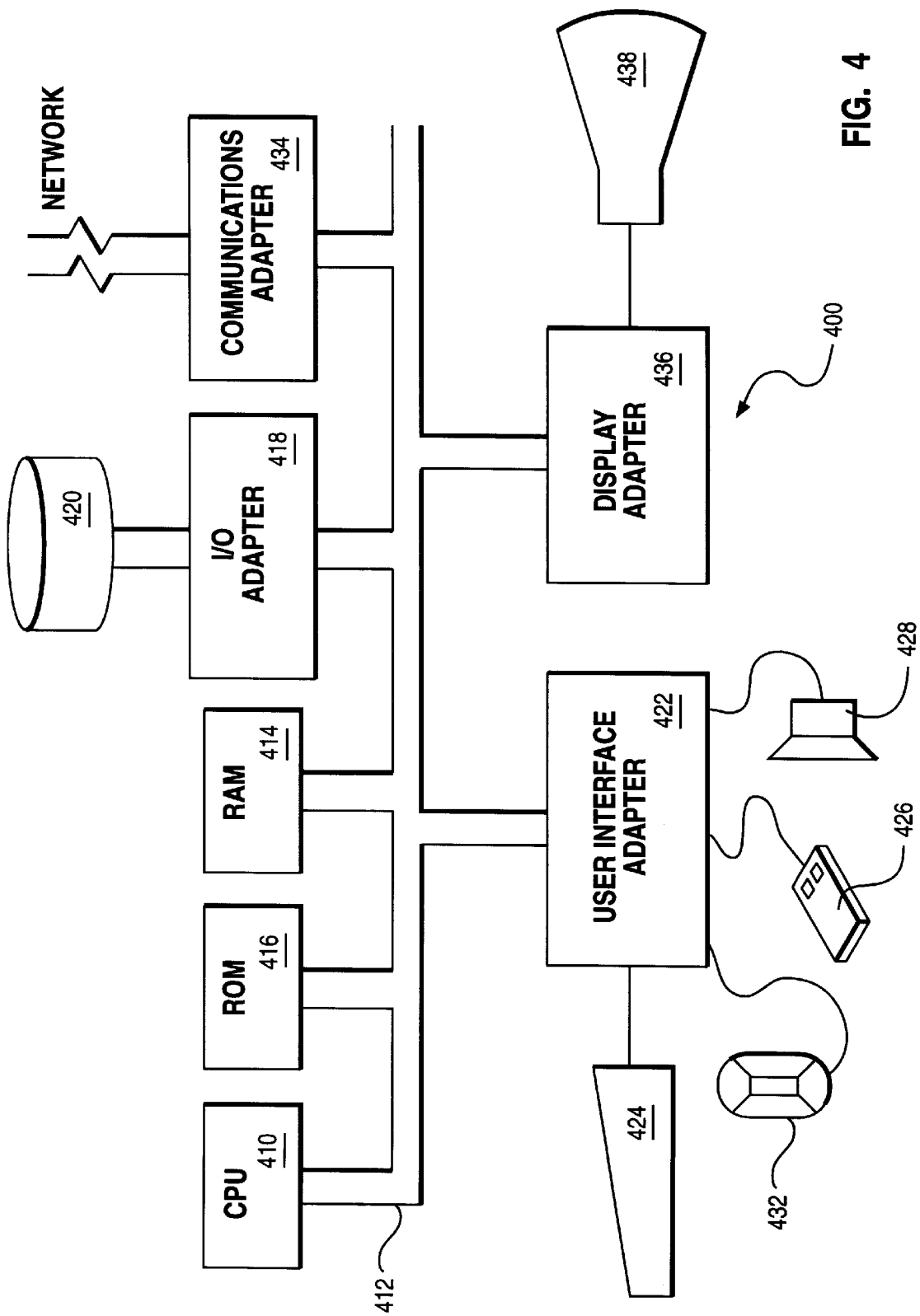
FIG. 4 illustrates a data processing system suitable for the implementations of FIGS. 3A and 3B.

The embodiment set forth in the method steps of the flow charts of FIGS. 3A and 3B may be implemented using conventional programming methods on a widely used central processing unit. According to this implementation, refer now to FIG. 4, which shows a conventional data processing system suitable for the invention. A central processing unit (CPU) is provided, such as a PowerPC microprocessor ("PowerPC" is a trademark of IBM Corporation) according "The PowerPC Architecture: A Specification for a New Family of RISC Processors", 2d edition, 1994, Cathy May, et al. Ed., which is incorporated herein by reference. The CPU is coupled to various other components by system bus 412. The history buffer of the present invention is included in CPU 410. Read only memory ("ROM") 416 is coupled to the system bus 412 and includes a basic input/output system ("BIOS") that controls certain basic functions of the data processing system. Random access memory ("RAM") 414, I/O adapter 418, and communications adapter 434 are also coupled to the system bus 412. I/O adapter 418 may be a small computer system interface ("SCSI") adapter that communicates with a disk storage device 420. Communications adapter 434 interconnects bus 412 with an outside network enabling the data processing system to communicate with other such systems. Input/Output devices are also connected to system bus 412 via user interface adapter 422 and display adapter 436. Keyboard 424, track ball 432, mouse 426 and speaker 428 are all interconnected to bus 412 via user interface adapter 422. Display monitor 438 is connected to system bus 412 by display adapter 436. In this manner, a user is capable of inputting to the system through the keyboard 424, trackball 432 or mouse 426 and receiving output from the system via speaker 428 and display 438. Additionally, an operating system such as DOS or the OS/2 system ("OS/2" is a trademark of the IBM Corporation) is used to coordinate the functions of the various components shown in FIG. 4.

Preferred implementations of the invention include implementations as a computer system programmed to execute the method or methods described herein, and as a computer program product. According to the computer system implementation, sets of instructions for executing the method or methods are resident in the random access memory 414 of one or more computer systems configured generally as described above. Until required by the computer system, the set of instructions may be stored as a computer program product in another computer memory, for example, in disk drive 420 (which may include a removable memory such as an optical disk or floppy disk for eventual use in the disk drive 420). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

Figure 5:
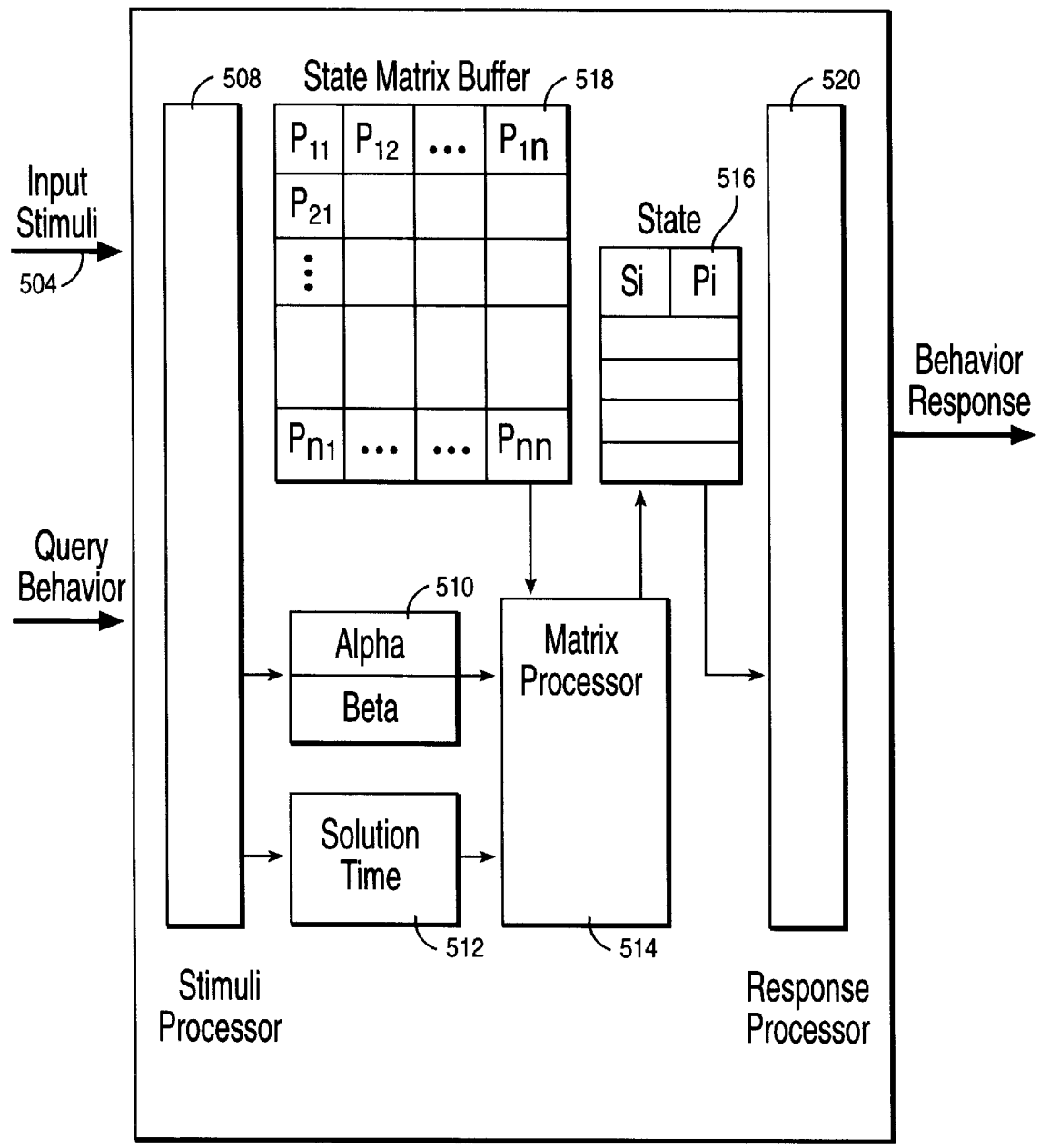
FIG. 5 illustrates aspects of an architecture for a processor suited for modulating among the predetermined states, according to an embodiment of the invention.

Markov models can be solved for transient solutions (m iterations), or for steady state solutions (very large m). For transient solutions, the matrix power method can be used, but for a steady state solution a system of linear equations needs to be solved. Specialized processing hardware is beneficial for solving such linear equations. Refer now to FIG. 5 for important aspects of specialized processing in a CPU well suited for practicing the invention. External stimuli are inputted at 504. These may be stimuli classified as events, as previously described. The inputs are processed at the stimuli processor 508. This may involve looking up values for calculation of parameters A and B in a lookup table, as has been previously described in connection with FIG. 2. Values for the parameters A and B are output by the stimuli processor, and are stored in Alpha and Beta registers

510. The current probabilities for each of the possible transitions are stored in the state matrix buffer 518. That is, probability $P_{11}$, as shown, represents the probability of staying in state 1. $P_{12}$ represents the probability of a transition from state 1 to state 2, and so on. A matrix processor 514 uses the probabilities from the state matrix buffer 518 and the alpha and beta registers to project an active state at a future time, as indicated by the time stored in solution time register 512. That is, rather than using a Monte Carlo simulation, as illustrated in FIGS. 3A and 3B, the matrix processor uses array processing to either obtain powers of a matrix, or solve simultaneous linear equations to determine the probability of being in each possible state.

The matrix processor 514, stores its results in state register 516. That is, the state register 516 stores the probability for each state that the state is active after the number of computational iterations as determined from solution time register 512. Output block 520 selects an active state for the time defined in solution time register 512, using the probabilities stored in the state register 516. The response processor 520 may do this, for example, by merely selecting the state with the highest probability of being active.

To further understand the above described, specialized processing hardware, first consider a matrix multiplication method (i.e., matrix power method) which can be used to solve Markov models. For a two state system, with hypothetical probabilities, the one-step transition probability matrix, A, is as follows:

$$\begin{vmatrix} P11 = 0.75 & P12 = 0.25 \\ P21 = 0.5 & P22 = 0.5 \end{vmatrix}$$

where, P11 refers to the probability of transitioning from state 1 to state 1; P12, refers to the probability of transitioning from state 1 to state 2; etc.

The state of the system at time n can be obtained from the one-step transition probability matrix P and the initial probability vector.

For a Markov model:

p(n)=An p(0)

For further details see K. S. Trivedi, "Probability and Statistics with Reliability Queuing and Computer Science Applications", 1982, Prentice-Hall, Inc., pages 309–317, which is hereby incorporated herein by reference.

For the probability transition matrix A, as shown, and for n=2, multiplying the transition matrix by itself gives $$A^2 = \begin{vmatrix} 11/16 & 5/16 \\ 5/8 & 3/8 \end{vmatrix}$$

For an initial condition where state 2 is active, the conditional probability of being in state 2 after two time steps is the element P22 of the $A^2$ transition matrix. Also, the conditional probability of being in state after two time steps is the element P12.

Therefore:

If state 2 was initially active:
P22(2)=3/8
P12(2)=5/16, and the expected average amount of time spent for each of the states, where there have been two iterations, for example, is expressed by the following vector:

$$p(2) = p(0)A^2$$
$$= |01| \times \begin{vmatrix} 11/16 & 5/16 \\ 5/16 & 3/8 \end{vmatrix}$$
$$= |5/8 \quad 3/8|.$$

If state 1 was initially active:
P21(2)=5/8
P11(2)=11/16, $$p(2) = p(0)A^2$$
$$= |10| \times \begin{vmatrix} 11/16 & 5/16 \\ 5/8 & 3/8 \end{vmatrix}$$
$$= |11/16 \quad 5/16|.$$

In the above examples, p(0), the initially action state, is assumed a known certainty. Alternatively, the states could have an associated probability of being initially active. For example, for the illustrated 2 state system, p(0) could be:
p(0)=|1/3 2/3|.

The n step transition matrix for a two state model can be generalized using Theorem 7.1 in Trivedi. Formulas for each conditional probability can be obtained from Theorem 7.1.

Most Markov model applications are for system analysis and do not have a real time need. As a result, Markov model processing is done in software. For obtaining transient probabilities at a particular time t, the above described matrix power method usually works if t is small and the state space is not big. However, since the solution of Markov chains involves a matrix being multiplied n times, the matrix multiplication component of the solution becomes very compute intensive and wasteful. This is especially the case, since most Markov models lead to sparse matrices. A Markov model can also be solved via Monte Carlo simulation, as has been described in connection with FIG. 3B. In the simulation mode, however, the number of simulation steps is a factor.

Two improvements are provided in the present embodiment. First, better mathematical techniques are applied to obtain long run or stationary probabilities. The matrix equation for the Markov model can be viewed as a set of linear equations to be solved. Several direct and numerical techniques are applicable to solve these equations. W. J. Stewart, "Introduction to the Numerical Solution of Markov Chains", 1994, Princeton University Press, pages 63 through 70, which is hereby incorporated herein by reference, provides an explanation of the popular techniques to solve Markov models. An example of such a technique is the Direct Method of Gaussian Elimination. For this method an "LU decomposition" is needed. That is, the original matrix must be decomposed into a lower triangular matrix and an upper triangular matrix.

Figure 6:
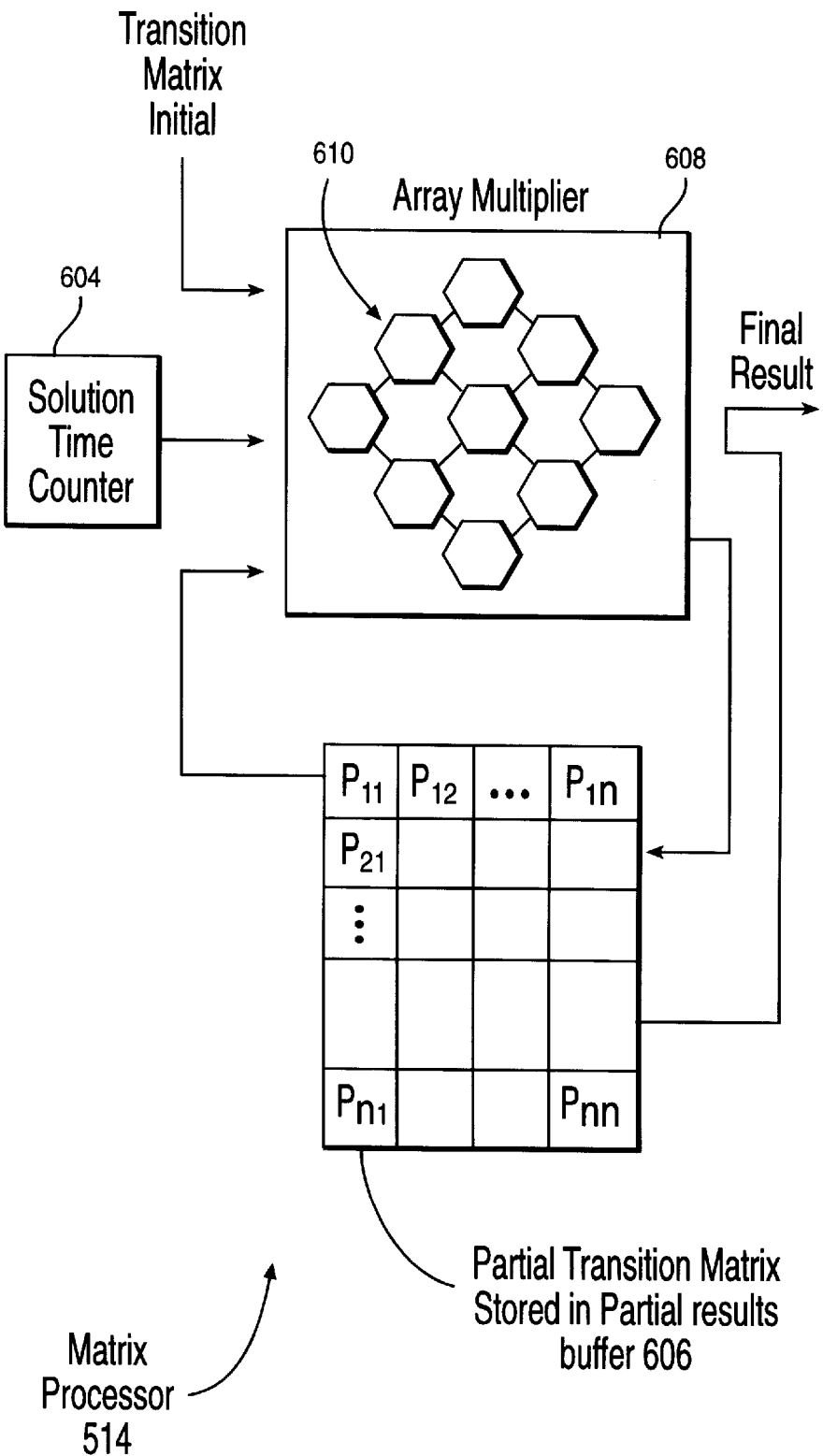
FIG. 6 illustrates an architecture for a state matrix processor according to the processor of FIG. 5.
Figure 7:
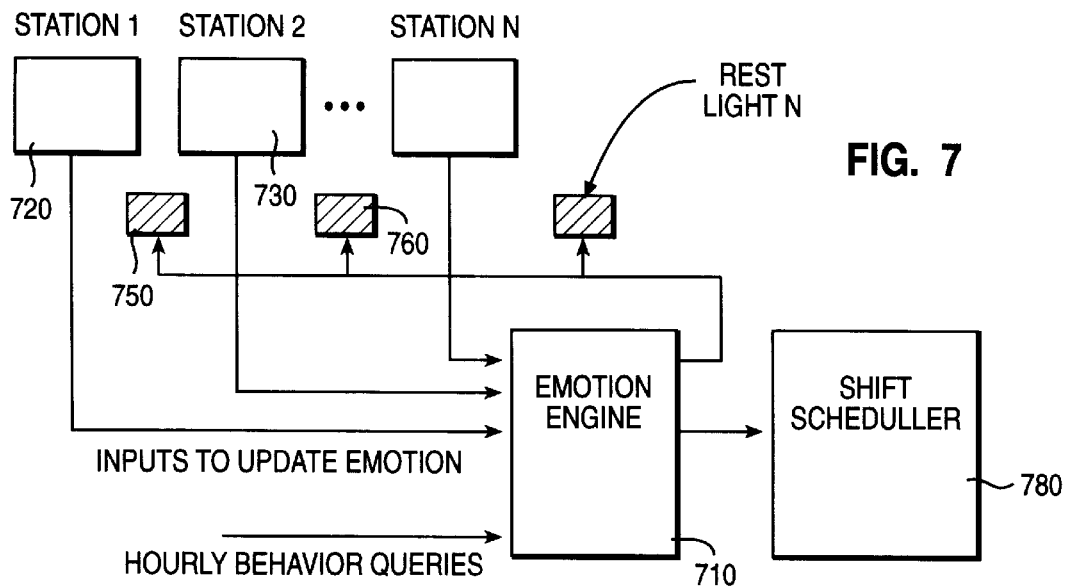
FIG. 7 illustrates a flight controller application.
Figure 8:
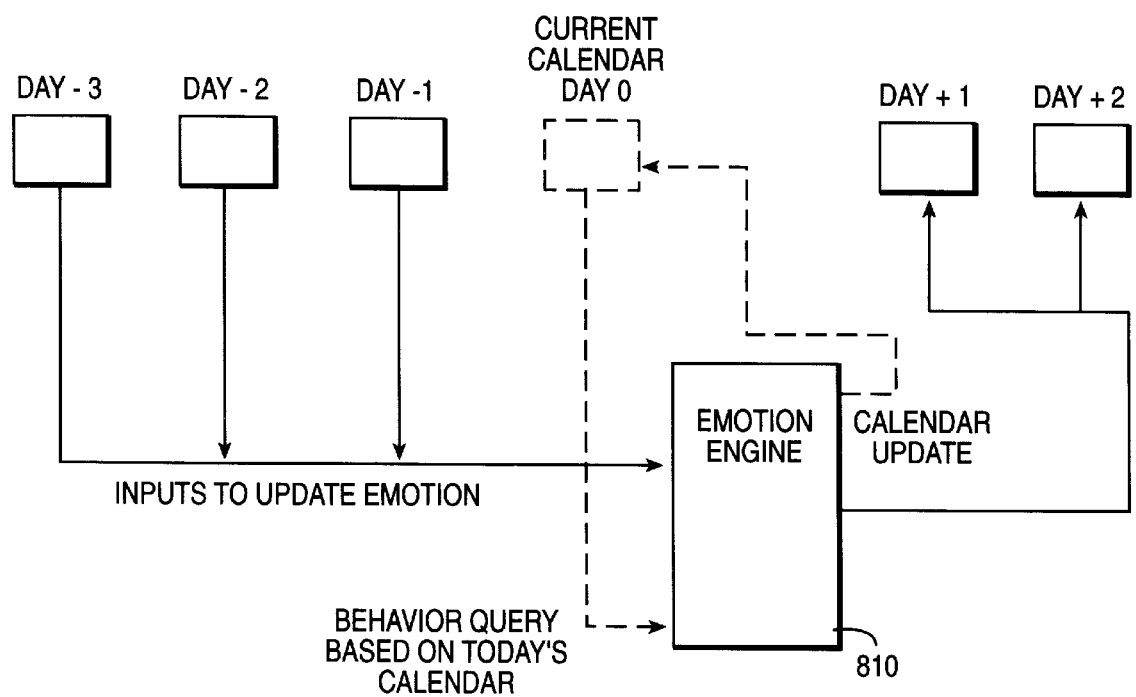
FIG. 8 illustrates a personal calendar assistant.

In a second improvement, the present embodiment provides hardware well-suited for the improved mathematical techniques. This is a particularly important improvement for the real time applications contemplated. With the above matrix multiplication method as background, now refer to FIGS. 5 and 6, for additional details concerning the matrix processor 514. A partial results buffer 606 stores results for intermediate steps. An array multiplier 608 implements an array style unit which solves a matrix in hardware. The matrix processor 514 has a time counter 604 which keeps track of solution steps. The heart of the hardware Markov processor is the array multiplier 608 for handling the transition matrix multiplications. The direct matrix multiplication technique can be implemented using hexagonal arrays, 610. Alternatively, LU decomposition can be done using Linear Arrays. For more details, see Carver A. Mead, "Intro to VLSI Systems", 1980, Addson-Wesley Publishing Company, pages 271–292, which is hereby incorporated herein by reference.

Although the present invention and its advantages have been described in detail, it should be understood that various changes, substitutions and alterations can be made without departing from the spirit and scope of the invention as defined by the following claims.

What is claimed is:

1. A computer aided method for modulating among states, wherein information is stored in a memory and processed by the computer, the method comprising the steps of:
    a) initializing the computer, including storing information in a memory representing: predefined categories of an external stimulus, n states, and likelihood functions for transitions among the respective states;
    b) applying the external stimulus to the computer;
    c) determining the category of the stimulus; and
    d) generating transition probability values for the likelihood functions responsive to the category of the stimulus.

2. The method of claim 1, wherein initializing step a) includes activating an initial one of the states, and wherein the method comprises the step of:
    e) transitioning from the initially selected state being activated to a subsequent one of the states being activated by the computer, responsive to the transition probability values.

3. The method of claim 2, wherein in step e) the transitioning is responsive to the transition probability values in accordance with a stochastic response.

4. The method of claim 3, wherein the transitioning responsive to the transition one probability values in accordance with a stochastic response includes:
    i) generating a value for a random variable, and
    ii) selecting the subsequent one of the states to be activated according to the value of the random variable.

5. The method of claim 2, wherein the transitioning step e) includes computing the transition probability values using an array multiplier, so that the transitioning may occur more quickly than by iterative computational steps.

6. The method of claim 5, wherein the array multiplier computes products using at least one of the following: a hexagonal array, and a linear array.

7. The method of claim 1, wherein such a predefined category has predefined first and second characteristics, and such a likelihood function is responsive to the first and second characteristics of the category of the stimulus.

8. The method of claim 7, wherein the predefined categories include events.

9. The method of claim 8, wherein the states include emotional states, the events include emotion bearing events, and the first and second characteristics of such an emotion bearing event have emotional characteristics.

10. A program storage device readable by a machine, tangibly embodying a program of instructions executable by the machine for modulating among states of a system, said program storage device comprising:
    a) first instruction means for initializing the computer, including storing information in a memory representing: predefined categories of an external stimulus, n states, and likelihood functions for transitions among the respective states;
    b) second instruction means for detecting the external stimulus, in response to the external stimulus being applied to the computer;
    c) third instruction means for determining the category of the stimulus; and
    d) fourth instruction means for generating transition probability values for the likelihood functions responsive to the category of the stimulus.

11. The program storage device of claim 10, wherein first instruction means includes means for activating an initial one of the states, and wherein the program storage device comprises:
    e) fifth instruction means for transitioning from the initially selected state being activated to a subsequent one of the states being activated by the computer, responsive to the transition probability values.

12. The program storage device of claim 11, wherein in the fifth instruction means the transitioning is responsive to the transition probability values in accordance with a stochastic response.

13. The program storage device of claim 12, wherein the fifth instruction means comprises:
    i) means for generating a value for a random variable, and
    ii) means for selecting the subsequent one of the states to be activated according to the value of the random variable.

14. The program storage device of claim 11, wherein the fifth instruction means includes sixth instruction means for computing the transition probability values using an array multiplier, so that the transitioning may occur more quickly than by iterative computational steps.

15. The program storage device of claim 14, wherein the sixth instruction means provides for the array multiplier using at least one of the following: a hexagonal array, and a linear array.

16. The program storage device of claim 10, wherein such a predefined category has predefined first and second characteristics, and such a likelihood function is responsive to the first and second characteristics of the category of the stimulus.

17. The program storage device of claim 16, wherein the predefined categories include events.

18. The program storage device of claim 17, wherein the states include emotional states, the events include emotion bearing events, and the first and second characteristics of such an emotion bearing event have emotional characteristics.

19. A computer system for modulating a state, the system comprising:
    a) means for initializing the computer, including storing information in a memory representing: predefined categories of an external stimulus, n states, and likelihood functions for transitions among the respective states;
    b) means for applying the external stimulus to the computer;
    c) means for determining the category of the stimulus; and
    d) means for generating transition probability values for the likelihood functions responsive to the category of the stimulus.

20. The computer system of claim 19, wherein the means for initializing includes means for selecting an initial one of the states to be activated, and wherein the system comprises:
    e) means for transitioning from the initially selected state being activated to a subsequent one of the states being activated by the computer, responsive to the transition probability values.

21. The computer system of claim 20, wherein the transitioning means e) is responsive to the transition probability values in accordance with a stochastic response.

22. The computer system of claim 21, wherein the transitioning means, responsive to the at least one probability value in accordance with a stochastic response, comprises:

i) means for generating a value for a random variable, and ii) means for selecting the subsequent one of the states to be activated according to the value of the random variable.

23. The computer system of claim 20, wherein the transitioning means includes means for computing the transition probability values using an array multiplier, so that the transitioning may occur more quickly than by iterative computational steps.

24. The computer system of claim 23, wherein the array multiplier includes at least one of the following: a hexagonal array, and a linear array.

25. The computer system of claim 19, wherein such a predefined category has predefined first and second characteristics, and such a likelihood function is responsive to the first and second characteristics of the category of the stimulus.

26. The computer system of claim 25, wherein the predefined categories include events.

27. The computer system of claim 26, wherein the states include emotional states, the events include emotion bearing events, and the first and second characteristics of such an emotion bearing event have emotional characteristics.

28. A computer aided method for modulating among states, wherein information is stored in a memory and processed by the computer, the method comprising the steps of:

a) detecting external stimuli as inputs at a system input/output interface;

b) processing the inputs by a stimuli processor;

c) storing values output by the stimuli processor in Alpha and Beta registers;

d) storing, in a state matrix buffer, current probabilities for possible transitions between predefined states; and e) projecting an active state at a future time, the time being indicated by a value stored in a solution time register, including the step of computing by a matrix processor, for each of a number of possible predefined states, probabilities that respective ones of the states are active after the number of computational iterations indicated by the value in the solution time register, wherein the computing by the matrix processor is responsive to the probabilities stored in the state matrix buffer and the parameters stored in the alpha and beta registers, and wherein the computing by the matrix processor includes computing by an array multiplier, so that the matrix processor computing may occur more quickly than by iterative computational steps.

29. The method of claim 28, wherein step e) comprises the steps of:

storing results of the array processing in a state register, wherein the results include the probability for each possible predefined state that the state is active after the number of computational iterations as determined from solution time register; and selecting an active state, for the time defined in solution time register, responsive to the probabilities stored in the state register.

30. The system of claim 29 comprising:

g) a state register, coupled to the matrix processor, for storing said probabilities for each possible predefined state; and h) a response processor for selecting, responsive to the probabilities stored in the state register, an active state for the time defined in solution time register.

31. A computer system modulating among states, wherein information is stored in a memory and processed by the computer, the system comprising:

a) a system input/output interface for detecting external stimuli as inputs;

b) a stimuli processor, coupled to the input/output interface, for processing the inputs;

c) Alpha and Beta registers, coupled to the stimuli processor, for storing values output by the stimuli processor;

d) a state matrix buffer for storing current probabilities for possible transitions between predefined states;

e) a solution time register for storing a value indicating a transient time interval;

f) a matrix processor, coupled to the state matrix buffer, Alpha and Beta Registers, and solution time register, for computing, for each possible predefined state, probabilities that the respective state is active after the number of computational iterations indicated by the value in the solution time register, and further responsive to the probabilities stored in the state matrix buffer and the parameters stored in the alpha and beta registers, wherein the matrix processor includes an array multiplier, so that the matrix processor computing may occur more quickly than by iterative computational steps.

* * * * *